(12) United States Patent
Goto et al.

(10) Patent No.: US 6,490,833 B1
(45) Date of Patent: Dec. 10, 2002

(54) WEATHER STRIP FOR MOVABLE ROOF

(75) Inventors: Teruhito Goto, Bisai (JP); Kazuyuki Hayashi, Bisai (JP); Akira Matsuura, Toyota (JP); Yasuo Oyama, Toyota (JP); Kotaro Oami, Kariya (JP)

(73) Assignees: Toyoda Gosei Co., Ltd., Aichi-ken (JP); Kabushiki Kaisha Toyoda Jidoshokki Seisakusho, Aichi-ken (JP)

( * ) Notice: Subject to any disclaimer, the term of this patent is extended or adjusted under 35 U.S.C. 154(b) by 0 days.

(21) Appl. No.: 09/471,341

(22) Filed: Dec. 23, 1999

(30) Foreign Application Priority Data

Dec. 28, 1998 (JP) ............................................ 10-372622

(51) Int. Cl.$^7$ ................................................. E04C 5/07
(52) U.S. Cl. ...................... 52/209; 52/302.1; 52/302.7; 52/213; 52/716.2; 52/716.5; 52/717.01
(58) Field of Search ........................... 52/716.1, 716.2, 52/213, 716.5, 716.6, 716.7, 717.02, 717.01, 302.7, 200; 296/209, 302.1, 137 B, 233

(56) References Cited

U.S. PATENT DOCUMENTS

| | | | | |
|---|---|---|---|---|
| 1,334,398 A | * | 3/1920 | Plym et al. ..................... 52/209 |
| 2,275,686 A | * | 3/1942 | Schonberg .................... 52/209 |
| 2,606,635 A | * | 8/1952 | Clingman .................. 52/716.1 |
| 4,126,352 A | * | 11/1978 | Vogel ....................... 296/137 B |
| 4,154,033 A | * | 5/1979 | Krueger et al. ................ 52/209 |
| 4,403,805 A | * | 9/1983 | Strem, Jr. et al. ............ 296/221 |
| 4,627,206 A | * | 12/1986 | Cox ............................... 52/302 |
| 4,892,351 A | * | 1/1990 | Ono et al. .................... 296/213 |
| 5,046,779 A | * | 9/1991 | Ichinose et al. ............. 296/216 |
| 5,069,502 A | * | 12/1991 | Sekine et al. ................ 296/223 |
| 5,154,471 A | * | 10/1992 | Mimura et al. ................ 296/93 |
| 5,228,743 A | * | 7/1993 | Regner ......................... 296/223 |
| 5,344,209 A | * | 9/1994 | Regner ......................... 296/223 |
| 5,669,657 A | * | 9/1997 | Miyazawa ................... 296/216 |
| 5,890,331 A | * | 4/1999 | Hope ........................... 52/209 |

FOREIGN PATENT DOCUMENTS

| | | |
|---|---|---|
| DE | 37 29 179 A1 | 3/1988 |
| DE | 197 16 390 C1 | 8/1998 |
| JP | 62-210120 | 9/1987 |
| JP | 3-230 | 1/1991 |
| JP | 5-185839 | 7/1993 |

OTHER PUBLICATIONS

Translation of German Office Action, dated Jul. 31, 2000 for German Patent Application No. 199 63 276.6–21.

* cited by examiner

*Primary Examiner*—Lanna Mai
*Assistant Examiner*—Phi Dieu Tran A
(74) *Attorney, Agent, or Firm*—Pillsbury Winthrop LLP

(57) ABSTRACT

A weather strip is attached to the periphery of an organic glass plate. The organic glass plate is supported by a slide panel. A space is defined between the weather strip and an end face of the periphery of the organic glass plate. The space accommodates thermal expansion of the organic glass plate. A tube is located at a corner of the weather strip. Foreign matter trapped in the space moves from the space to the tube and then is discharged from the space.

20 Claims, 4 Drawing Sheets

WEATHER STRIP FOR MOVABLE ROOF

BACKGROUND OF THE INVENTION

The present invention relates to a weather strip for movable roofs such as vehicle sunroofs and moonroofs.

FIG. 6 shows a typical movable roof, or sliding roof 51. The sliding roof 51 is formed in a ceiling 50 of a vehicle such as an automobile. A weather strip 52 is attached to the periphery of the sliding roof 51. The weather strip 52 seals the clearance between the sliding roof 51 and the opening thereby preventing rain from entering the passenger compartment. The weather strip 52 also prevents air from flowing through the clearance between the sliding roof 51 and the opening.

In the past, sliding roofs were made of inorganic glass. Recently, to reduce the weight, organic glass such as polycarbonate is used to form sliding roofs. The sliding roof 51 includes an organic glass plate 53.

The organic glass plate 53 expands and shrinks in accordance with the temperature. Thus, if the weather strip 52 is adhered to the plate 53 with adhesive, temperature changes deform the sliding roof 51 due to the fact that the parts have different coefficients of thermal linear expansion of the glass plate 53.

Therefore, a sliding roof 54 shown in FIGS. 7 and 8 has been introduced. The sliding roof 54 includes a slide panel 55, an organic glass plate 53 and a weather strip 56. The glass plate 53 is fixed to the upper surface of the slide panel 55 by adhesive 57. The weather strip 56 is engaged with the periphery of the glass plate 53. A cover lip 58 extends inward and contacts the upper surface of the glass plate 53 without adhesive in between. The glass plate 53 can be moved relative to the cover lip 58. A space S is defined between the weather strip 56 and the periphery of the glass plate 53. When the glass plate 53 expands due to a temperature change, the space S accommodates the expansion.

The weather strip 56 is formed by extrusion molding and injection molding. First, the weather strip 56 is linearly extruded by extruder. The extruded weather strip 56 has the cover lip 58 and a base 59 as shown in FIG. 7. Then, the weather strip 56 is bent at corner portions, one of which is shown in FIG. 8. At this time, the base 59 is cut off at corner portions. New bases 59 (the cross hatched portion in FIG. 8) are then formed by injection molding at the corner portions.

The cover lip 58 and the periphery of the glass plate 53 are not adhered to each other by adhesive. Thus, foreign matter such as mud and water can enter the space S between the cover lip 58 and the glass plate 53. The foreign matter remains in the space S.

SUMMARY OF THE INVENTION

Accordingly, it is an objective of the present invention to provide a weather strip for movable roofs that discharges foreign matter trapped in the space between the weather strip and the organic glass plate in a movable roof.

To achieve the above objective, the present invention provides a weather strip. The weather strip is attached to the periphery of an organic glass plate. The organic glass plate is supported by a support frame. A passage permits foreign matter trapped in a space to discharge from the space. The space is defined between the weather strip and an end face of the periphery of the organic glass plate. The space accommodates thermal expansion of the organic glass plate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
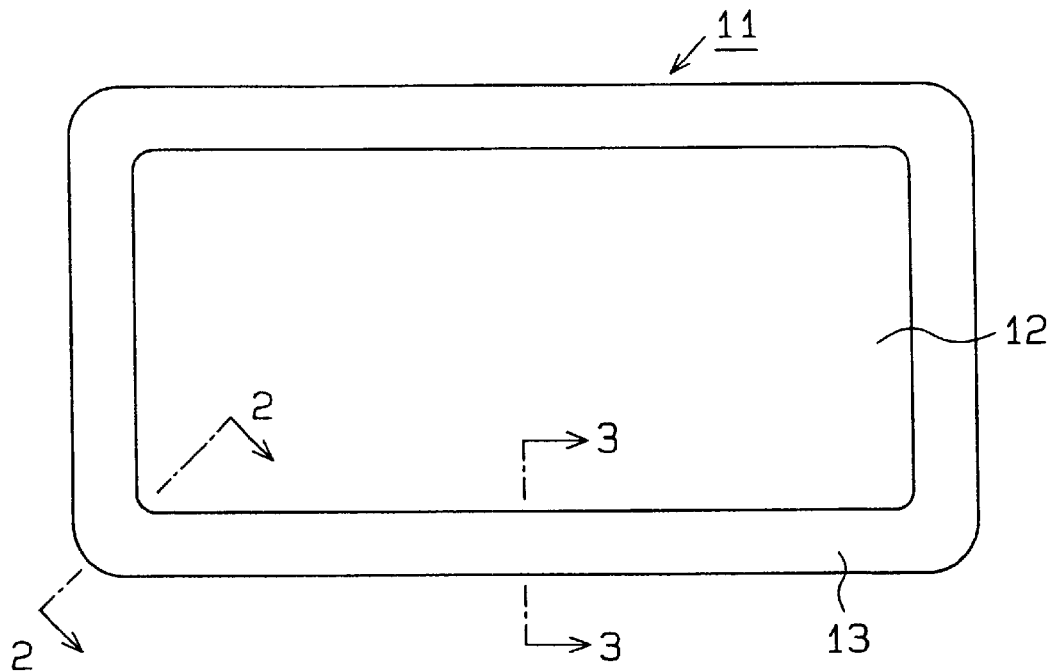
FIG. 1 is a plan view showing a sliding roof according to a first embodiment of the present invention.

A first embodiment of the present invention will now be described with reference to FIGS. 1, 2 and 3. FIG. 1 shows a sliding roof 11.

The sliding roof 11 includes a rectangular transparent organic glass plate 12, a weather strip 13 attached to the periphery of the glass plate 12 and a support frame supporting the glass plate 12 and the weather strip 13. In this embodiment, the support frame is a metal slide panel 14. The glass plate 12 is made of polycarbonate. The polycarbonate expands and shrinks in accordance with temperature changes. The weather strip is made of EPDM (ethylene-propylene-diene copolymer) solid rubber.

The weather strip 13 includes a hollow seal 16, a lip 17, a main body 130 having a groove 18, a cover lip 19 and a base 20. The lip 17 extends downward, or toward the passenger compartment, from the seal 16. The groove 18 of the main body 130 engages with a flange portion of the slide panel 14. The cover lip 19 extends from the main body 130 inwardly and covers the periphery of the glass plate 12. As shown in FIG. 3, the base 20 extends from the main body 130 parallel to the cover lip 19. The seal 16 includes a hollow portion 15. The weather strip 13 is basically formed by extrusion molding. The seal 16 may be made of EPDM (ethylene-propylene-diene copolymer) sponge rubber.

Figure 3:
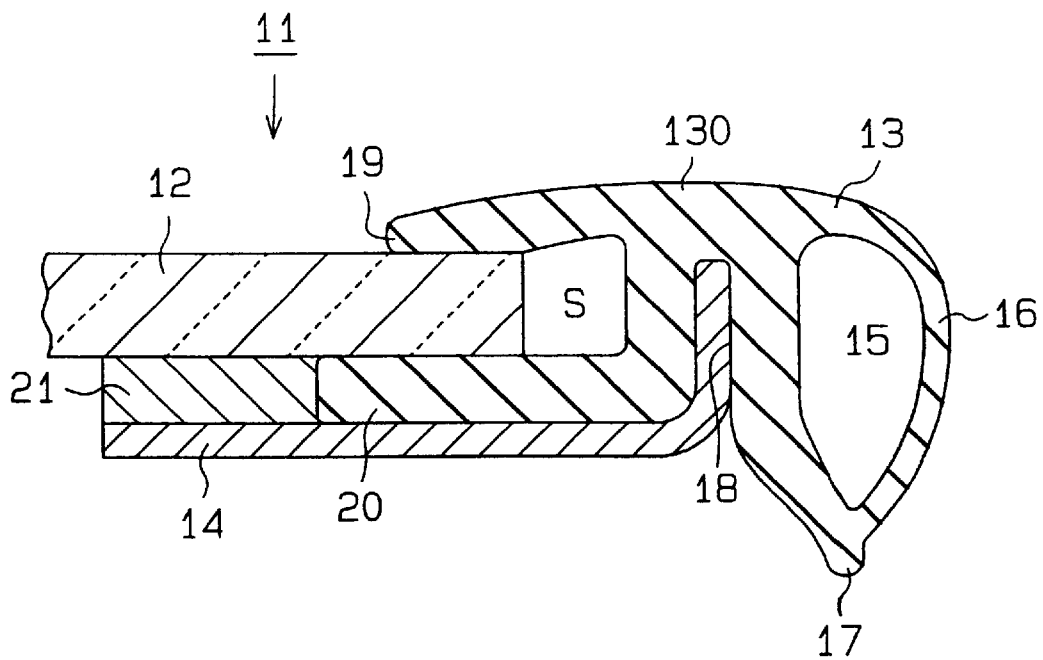
FIG. 3 is a cross-sectional view taken along line 3—3 of FIG. 1.

As shown in FIG. 3, the slide panel 14 has a substantially L-shaped cross-section including the flange portion. When viewed from upper-side, the slide panel 14 is shaped like a rectangular frame. The main body 130 of the weather strip 13 is mounted on the flange portion of the slide panel 14. The base 20 of the weather strip 13 is located on the upper surface of the slide panel 14. The peripheral portion of the glass plate 12 is located between the base 20 and the cover lip 19 of the weather strip 13. The slide panel 14, and the glass plate 12 are fixed each other by adhesive 21.

Due to the elasticity of the EPDM solid rubber, the cover lip 19 is pressed against and contacts the upper surface of the glass plate 12. There is no adhesive between the glass plate 12 and the cover lip 19, which permits the glass plate 12 to move relative to the cover lip 19. A space S is defined between the weather strip 13 and an end face of the glass plate 12. When the glass plate 12 expands due to a temperature increase, the expansion of the glass plate 12 is accommodated by the space S. The adhesive 21 elastically deforms to accommodate the thermal expansion of the glass plate 12. Therefore, the adhesive 21 is not separated from the glass plate 12 and from the slide panel 14 due to the thermal expansion of the glass plate 12.

Figure 2:
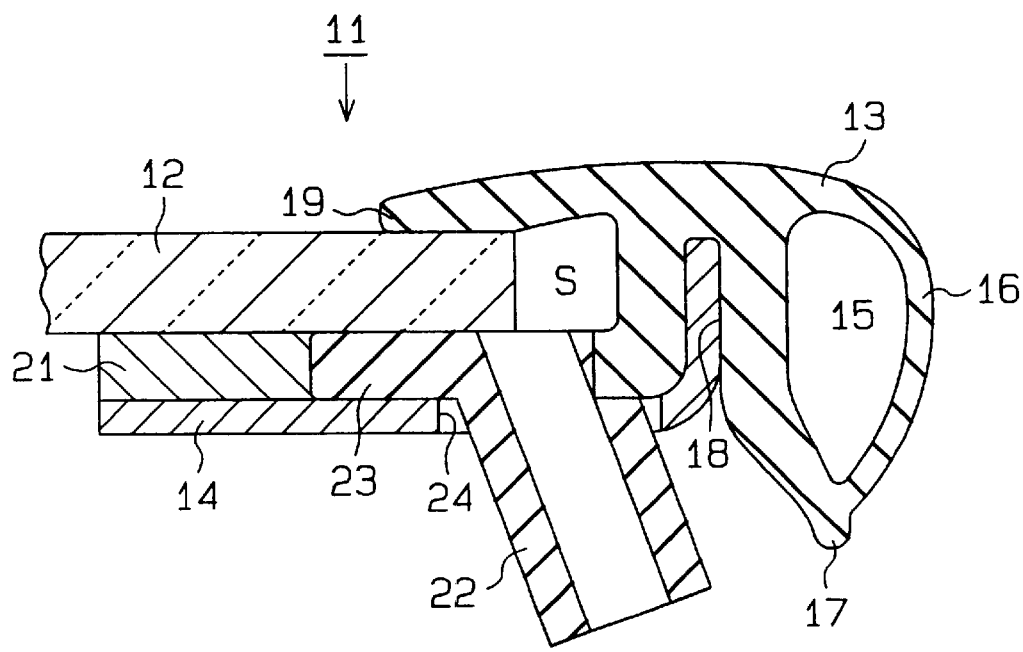
FIG. 2 is a cross-sectional view taken along line 2—2 of FIG. 1.

As shown in FIG. 2, each corner portion of the sliding roof 11 includes a passage for discharging foreign matter. In this embodiment, the passages are tubes 22. The total number of the tubes 22 is four in this embodiment. The tubes 22 discharge foreign matter from the space S. When forming the weather strip 13, the base 20 is cut off at the corner portions. Then, the base 23 is formed by injection molding. Each tube 22 is integrally formed with the corresponding base 23 at one of the corner portions.

The slide panel 14 has through holes 24. Each tube 22 extends through one of the holes 24 and protrudes from the weather strip 13. Each tube 22 has an inlet communicating with the space S and an outlet communicating with a gutter (not shown) located in the ceiling panel of the passenger compartment. Each tube 22 is inclined relative to a vertical line to the upper surface of the glass plate 12. Specifically, each tube 22 is inclined outwardly as shown in FIG. 2.

The procedure for forming the weather strip 13 will now be described.

Unvulcanized EPDM rubber is extruded by an extruder. The EPDM rubber is vulcanized by a vulcanizer and is then cooled. Consequently, an elongated EPDM rubber extrusion (the weather strip 13 before cutting) is formed. Then, the EPDM rubber extrusion is cut in accordance with the size of the sliding roof 11. The base 20 is cut off at the corner portions of the weather strip 13.

Then, each corner portion is bent to conform with the shape of the corresponding corner of the sliding roof 11 and is then inserted into a predetermined mold for making a predetermined cavity. Unvulcanized EPDM rubber is injected into the cavity of the mold and is vulcanized. Accordingly, the tube 22 and the base 23 are formed in each corner portion of the weather strip 13.

The sliding roof 11 functions as follows.

When the vehicle is moving, foreign matter may enter the space S through between the cover lip 19 and the glass plate 12. The foreign matter moves from the space S to the tubes 22 and is then discharged out of the weather strip 13. The foreign matter is sent to the exterior of the vehicle through gutters (not shown) located in the ceiling of the vehicle.

When forming the corner portions of the weather strip 13, the tubes 22 are integrally formed with the base 23 of the weather strip 13, which simplifies the manufacturing procedure of the sliding roof 11.

Each tube 22 is inclined relative to a perpendicular line to the upper surface of the glass plate 12. In other words, the outlet of each tube 22 is directed away from the passenger compartment, which prevents foreign matter from entering the passenger compartment. Engagement between each tube 22 and the corresponding hole 24 defines the position of the weather strip 13 relative to the slide panel 14 thereby facilitating the installation.

A second embodiment will now be described with reference to FIG. 4. The differences from the first embodiment of FIG. 2 will mainly be discussed below.

Figure 4:
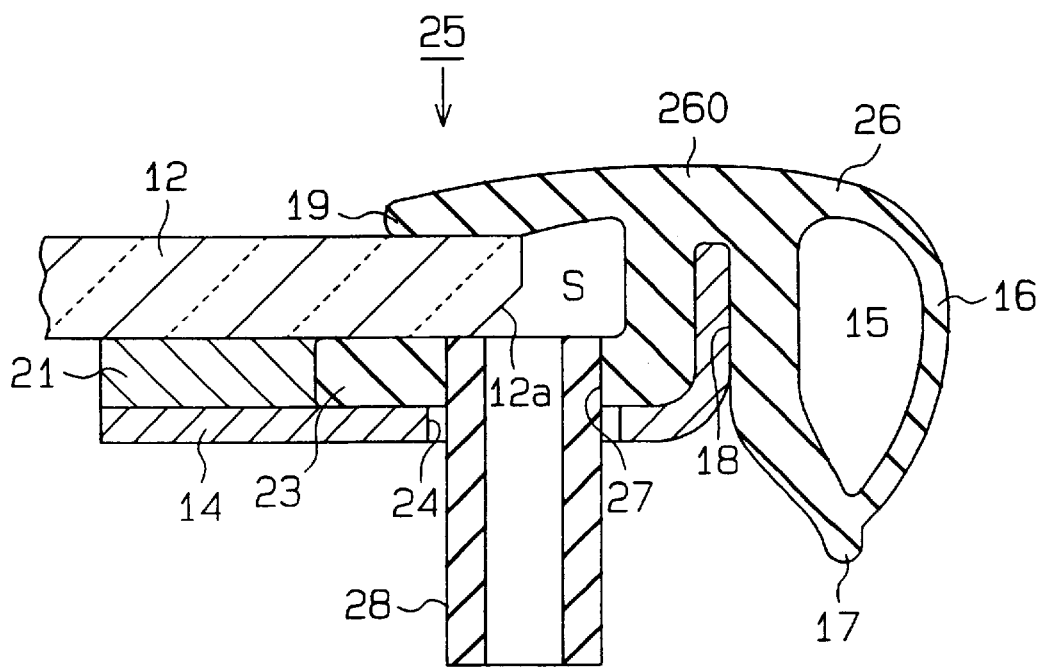
FIG. 4 is partial cross-sectional view showing a sliding roof according to a second embodiment.

As shown in FIG. 4, a weather strip 26 includes a main body 260 and a base 23. The base 23 has holes 27. The slide panel 14 has holes 24. Each hole 27 and each hole 24 correspond to one of the corner portions of the weather strip 26. Each hole 27 communicates with the space S and the corresponding hole 24. A tube 28, which is formed separately from the weather strip 26, is fixed to each hole 27. The tubes 28 discharge foreign matter from the space S.

Each tube 28 is perpendicular to the bottom surface of the glass plate 12. Each tube 28 includes an inlet and an outlet. The inlet communicates with the space S and the outlet communicates with the gutter located in the ceiling panel of the vehicle. The material of the tube 28 is not limited to EPDM solid rubber, which is used to form the weather strip 26. The tube 28 may be made of plastic or metal. A chamfered surface 12a is formed on the edge of the glass plate 12 at every corner. Each chamfered surface 12a enlarges the cross-sectional area of the corresponding tube inlet.

The tubes 28 discharge foreign matter from the space S to the exterior of the weather strip 26. The passages are formed by simply forming the holes 27, 24 and installing the tubes 28, which is a relatively simple procedure.

Engagement of each tube 28 with the corresponding hole 24 defines the location of the weather strip 26 relative to the slide panel 14, which facilitates the installation.

Each chamfered surface 12a enlarges the cross-sectional area of the corresponding tube inlet, which facilitates the discharge of foreign matter in the space S.

Figure 5:
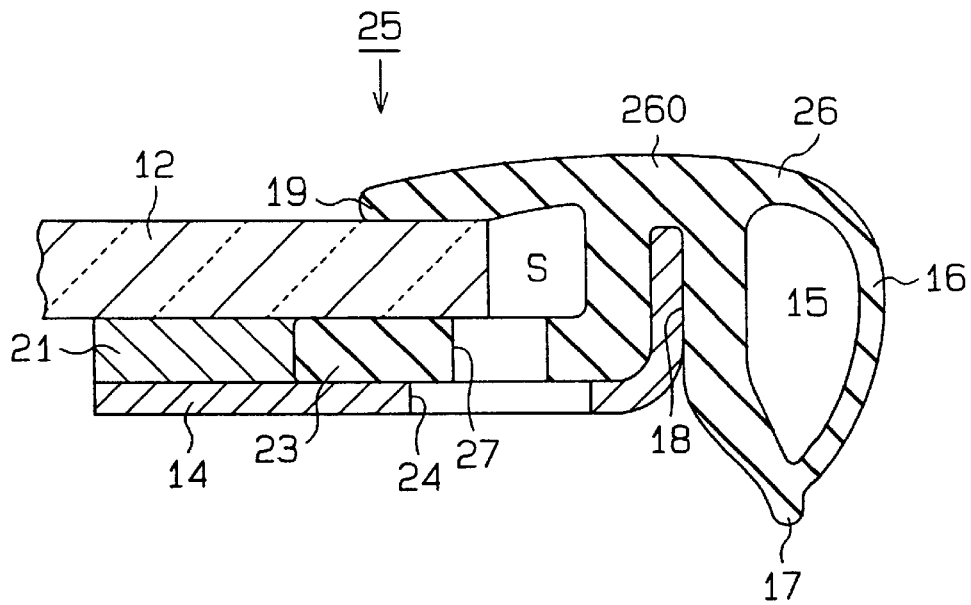
FIG. 5 is a partial cross-sectional view showing a sliding roof according to a third embodiment.
Figure 6:
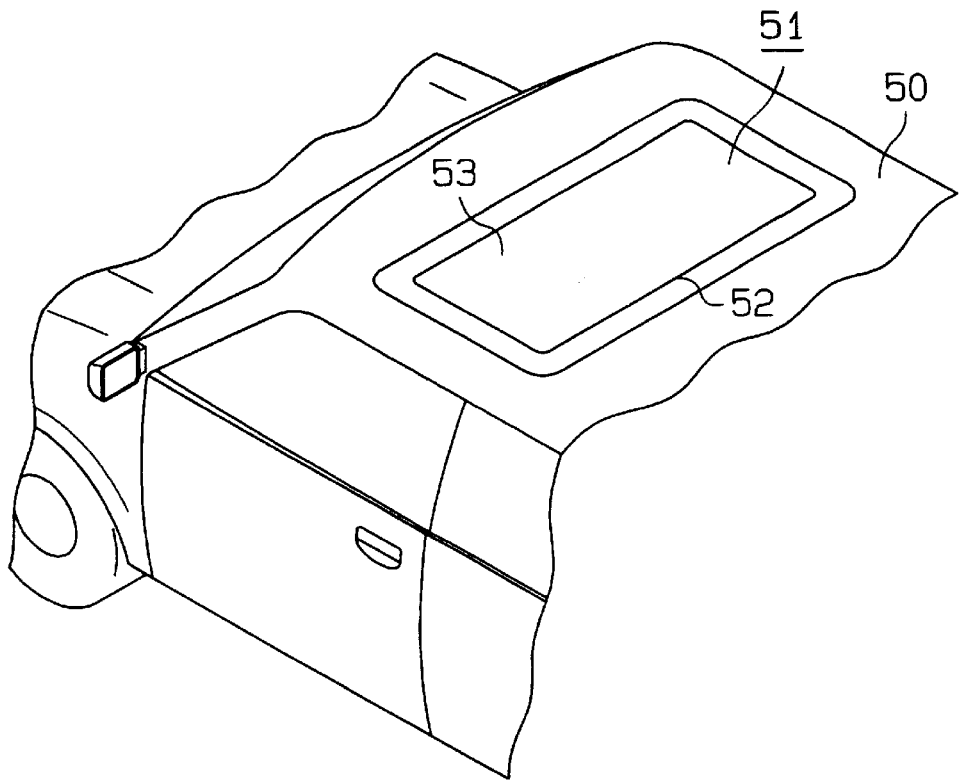
FIG. 6 is a partial perspective view showing a prior art sliding roof.
Figure 7:
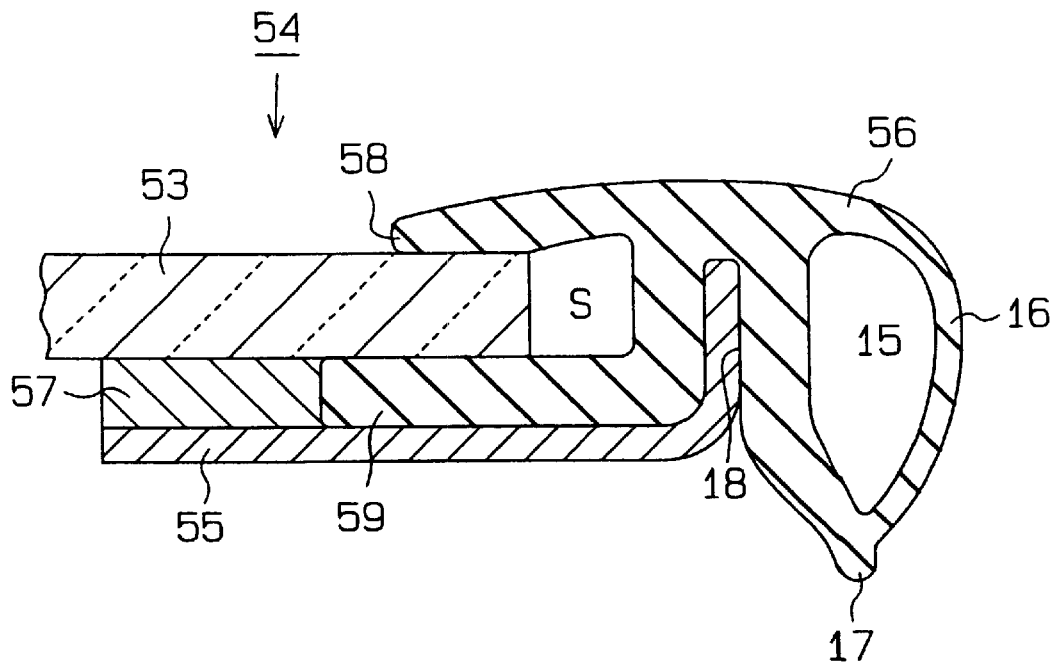
FIG. 7 is a cross-sectional view showing a linear portion of a prior art weather strip.
Figure 8:
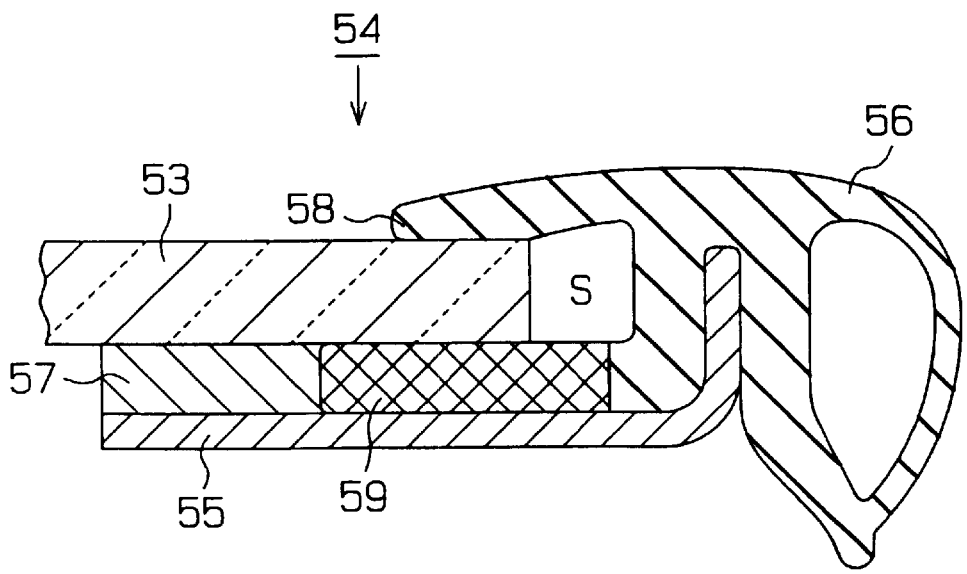
FIG. 8 is a cross-sectional view showing a corner portion of the weather strip of FIG. 7.

FIG. 5 shows a third embodiment. Unlike the second embodiment of FIG. 4, the third embodiment does not use the tube 28 as the passages for discharging foreign matter. Specifically, the holes 27, 24 form the passage for discharging foreign matter. Thus, foreign matter in the space S is discharged to the exterior through the holes 27, 24.

The passage for discharging foreign matter in the embodiment of FIG. 5 is formed by the holes 27, 24, which simplifies the manufacturing procedure of the sliding roof 25 in comparison to the embodiment of FIG. 4.

The illustrated embodiments may be modified as follows. The number of the tubes 22, 28 need not be four to correspond to the corner portions. The number of the tubes 22, 28 may be changed. A greater number of tubes 22, 28 generally results in more effective discharge of foreign matter. If the number of the tubes is smaller than that of the illustrated embodiments, the number of the manufacturing steps is reduced.

The tubes 22, 28 may be located in places other than corners of the weather strips 13, 26. That is, the tubes 22, 28 may be located in the linear portions of the weather strips 13, 26, which permits foreign matter trapped in the linear portions to be quickly discharged. Alternatively, the tubes 22, 28 may be located both in the corner portions and the linear portions. Providing the tubes 22, 28 both in the corner portions and the linear portions results in very effective removal of foreign matter.

In the embodiment of FIG. 2, each tube 22 may be perpendicular to the bottom surface of the slide panel 14. In the second embodiment of FIG. 4, each tube 28 may be outwardly inclined toward the lip 17.

The organic glass plate 12 shown in FIGS. 1 and 5 may have a chamfered surface like the chamfered surface 12a shown in FIG. 4. The chamfered surface of the glass plate 12 enlarges the cross-sectional entrance area of the tube 22 and of the hole 27, which facilitates the discharge of foreign matter to the outside of the weather strip 26.

In the embodiments shown in FIGS. 1 to 5, the bottom of the space S may be sloped. Specifically, the height of the bottom of the space S is highest at the location of line 3—3 in FIG. 1. The bottom of the space S is sloped downward toward the corner portions of the sliding roof 11. The height of the bottom is as shown in FIGS. 2 to 5 in the corner portions and in their vicinities. The sloped bottom of the space S allows foreign matter in the space S to readily move to the corner portions. Then, the foreign matter is discharged from of the weather strip 13, 26.

The organic glass plate 12 may be made of resin such as acrylic resin. The weather strips 13, 26 may be formed of materials other than EPDM.

Further, the present invention may be embodied in other types of movable roofs such as tilt type roofs.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An assembly comprising a weather strip attached to the periphery of an organic glass plate which is to be supported by a support frame having a flange;
   wherein said weather strip comprises a main body portion with a groove formed therein, said groove configured to engage the flange of said support frame therein to attach said weather strip to said support frame;
   wherein said weather strip has a cover lip extending in an inward direction from said main body portion and overlying a portion of an upper surface of said organic glass plate in contact therewith;
   wherein said weather strip further comprises a base portion extending in said inward direction from said main body portion and underlying a portion of a lower surface of said organic glass plate in contact therewith;
   wherein a space in which foreign debris can be caught is defined by an undersurface of said cover lip, an innerfacing surface of said main body portion, an upper surface of said base portion, and an end face of the periphery of said organic glass plate, said space being sized to permit thermal expansion of said organic glass plate; and
   wherein the weather strip has a passage in communication with said space and a region exterior to said space for permitting foreign matter trapped in the space to be discharged from the space.

2. The assembly according to claim 1, wherein the passage is formed by a tube.

3. The assembly according to claim 2, wherein the tube extends from the weather strip to protrude from the support frame.

4. The assembly according to claim 2, wherein the tube is integrally formed with the weather strip.

5. The assembly according to claim 4, wherein the weather strip has an injection molded portion that includes the tube.

6. The assembly according to claim 5, wherein the injection molded portion is a corner portion of the weather strip.

7. The assembly according to claim 2, wherein the tube is located at a corner of the weather strip.

8. The assembly according to claim 2, wherein the tube protrudes from the weather strip and extends outward from the organic glass plate.

9. The assembly according to claim 1, wherein the passage includes a hole extending through the weather strip.

10. The assembly according to claim 1, wherein the passage has an inlet communicating with the space and wherein the organic glass plate is chamfered at least at a portion corresponding to the inlet such that the organic glass plate does not interfere with the inlet.

11. A movable roof for opening and closing an opening located in a ceiling panel of an automobile, the movable roof comprising:
    a substantially rectangular support frame having a flange;
    a substantially rectangular organic glass plate supported by the support frame; and
    a weather strip attached to the periphery of the organic glass plate;
    wherein said weather strip comprises a main body portion with a groove formed therein, said groove engaging the flange of said support frame therein and thereby attaching said weather strip to said support frame;
    wherein said weather strip has a cover lip extending in an inward direction from said main body portion and overlying a portion of an upper surface of said organic glass plate in contact therewith;
    wherein said weather strip further comprises a base portion extending in said inward direction from said main body portion and underlying a portion of a lower surface of said organic glass plate in contact therewith;
    wherein said weather strip further has a hollow seal portion protruding outwardly from the main body portion of the weather strip, the hollow seal portion forming a seal between the movable roof and the periphery of the opening in the ceiling panel of the automobile when the movable roof is closed;
    wherein a space in which foreign debris can be caught is defined by an undersurface of said cover lip, an innerfacing surface of said main body portion, an upper surface of said base portion, and an end face of the periphery of said organic glass plate, said space being sized to permit thermal expansion of said organic glass plate; and
    wherein the weather strip has a passage formed therein, the passage connecting the space to a region exterior to the weather strip to permit foreign matter caught in the space to be discharged from the space.

12. The movable roof according to claim 11, wherein the passage is formed by a tube.

13. The movable roof according to claim 12, wherein the tube extends from the weather strip to protrude from the support frame.

14. The movable roof according to claim 12, wherein the tube is integrally formed with the weather strip.

15. The movable roof according to claim 14, wherein the weather strip has an injection molded portion that includes the tube.

16. The movable roof according to claim 15, wherein the injection molded portion is a corner portion of the weather strip.

17. The movable roof according to claim 12, wherein the tube protrudes from the weather strip and extends outward from the organic glass plate.

18. The movable roof according to claim 11, wherein the passage has an inlet communicating with the space and wherein the organic glass plate is chamfered at least at a portion corresponding to the inlet such that the organic glass plate does not interfere with the inlet.

19. A weather strip attached to the periphery of an organic glass plate which is supported by a support frame, the weather strip comprising a passage for permitting foreign matter trapped in a space to be discharged from the space,
- wherein the space is enclosed by the weather strip and is defined between the weather strip and an end face of the periphery of the organic glass plate,
- wherein the space permits thermal expansion of the organic glass plate,
- wherein the passage has an inlet communicating with the space, and
- wherein the organic glass plate is chamfered at least at a portion corresponding to the inlet such that the organic glass plate does not interfere with the inlet.

20. A movable roof for opening and closing an opening located in a ceiling panel of an automobile, the movable roof comprising:

- a support frame;
- an organic glass plate supported by the support frame;
- a weather strip attached to the periphery of the organic glass plate, wherein a space is enclosed by the weather strip and is defined between the weather strip and an end face of the periphery of the organic glass plate and wherein the space permits thermal expansion of the organic glass plate; and
- a passage formed in the weather strip for connecting the space to the exterior of the weather strip to permit foreign matter trapped in the space to be discharged from the space, wherein the passage has an inlet communicating with the space and wherein the organic glass plate is chamfered at least at a portion corresponding to the inlet such that the organic glass plate does not interfere with the inlet.

* * * * *